United States Patent
Abe et al.

(10) Patent No.: US 7,903,982 B2
(45) Date of Patent: Mar. 8, 2011

(54) OPTICAL RECEIVER

(75) Inventors: Jun'ichi Abe, Tokyo (JP); Takashi Sugihara, Tokyo (JP); Katsuhiro Shimizu, Toyko (JP)

(73) Assignee: Mitsubishi Electric Corporation, Tokyo (JP)

( * ) Notice: Subject to any disclaimer, the term of this patent is extended or adjusted under 35 U.S.C. 154(b) by 908 days.

(21) Appl. No.: 10/589,349

(22) PCT Filed: Apr. 15, 2004

(86) PCT No.: PCT/JP2004/005374
§ 371 (c)(1),
(2), (4) Date: Aug. 11, 2006

(87) PCT Pub. No.: WO2005/101702
PCT Pub. Date: Oct. 27, 2005

(65) Prior Publication Data
US 2007/0177885 A1 Aug. 2, 2007

(51) Int. Cl.
*H04B 10/06* (2006.01)
(52) U.S. Cl. ......... 398/202; 398/208; 398/212; 398/213; 398/164; 398/27
(58) Field of Classification Search ............ 398/26, 398/27, 140, 158–164, 202–210
See application file for complete search history.

(56) References Cited

U.S. PATENT DOCUMENTS

| | | | | |
|---|---|---|---|---|
| 5,052,051 A | * | 9/1991 | Naito et al. | 398/204 |
| 5,295,013 A | * | 3/1994 | Ono | 398/205 |
| 7,127,166 B2 | * | 10/2006 | Glingener | 398/65 |
| 7,209,671 B1 | * | 4/2007 | Hayee et al. | 398/207 |
| 2001/0015845 A1 | * | 8/2001 | Ito et al. | 359/189 |
| 2003/0118345 A1 | * | 6/2003 | Tomizawa et al. | 398/140 |
| 2003/0170022 A1 | * | 9/2003 | Josef Moeller | 398/27 |
| 2004/0131368 A1 | * | 7/2004 | Sawada et al. | 398/202 |
| 2004/0165894 A1 | | 8/2004 | Taga et al. | |
| 2004/0165895 A1 | * | 8/2004 | Taga et al. | 398/202 |
| 2005/0185969 A1 | * | 8/2005 | Moeller et al. | 398/202 |

FOREIGN PATENT DOCUMENTS

| | | |
|---|---|---|
| EP | 1 318 639 A1 | 6/2003 |
| JP | 4-30634 A | 2/1992 |
| JP | A-9-294141 | 11/1997 |
| JP | 2000-341344 A | 12/2000 |
| JP | 2001-177582 A | 6/2001 |
| JP | 2003-163637 A | 6/2003 |
| JP | 2003-234699 A | 8/2003 |
| WO | WO 03/026239 * | 3/2003 |
| WO | WO-03/026239 A1 | 3/2003 |

OTHER PUBLICATIONS

M. Tomizawa et al., Technical Diges of OFC 2002, WX7, pp. 368 and 370.

* cited by examiner

*Primary Examiner* — Li Liu
(74) *Attorney, Agent, or Firm* — Birch, Stewart, Kolasch & Birch, LLP

(57) ABSTRACT

An optical divider divides an optical input signal into a plurality of paths. A plurality of optical-to-electrical converters respectively converts the divided optical input signals into electrical signals. A plurality of discriminators respectively outputs discrimination results by discriminating the electrical signals output from the optical-to-electrical converters based on predetermined thresholds. An operational circuit performs a predetermined logical operation with the discrimination results output from the discriminators.

13 Claims, 7 Drawing Sheets

TRUTH TABLE OF OR CIRCUIT

| Q1 | Q2 | Q |
|---|---|---|
| 0 | 0 | 0 |
| 1 | 0 | 1 |
| 0 | 1 | 1 |
| 1 | 1 | 1 |

TRUTH TABLE OF AND CIRCUIT

| Q1 | Q2 | Q |
|---|---|---|
| 0 | 0 | 0 |
| 1 | 0 | 0 |
| 0 | 1 | 0 |
| 1 | 1 | 1 |

OPTICAL RECEIVER

TECHNICAL FIELD

The present invention relates to an optical receiver, and, more particularly to an optical receiver technology applied to very-high-speed/very-long-distance optical transmission systems and the like.

BACKGROUND ART

In the very-high-speed/very-long-distance optical transmission systems by an Intensity Modulation/Direct Detection (IM/DD) method, an error correction code has been mainly used as means for improvement of reception sensitivity of the optical receiver. However, in the recent rapid increase in a transmission volume and a transmission distance, application of a technology for further improvement of reception sensitivity of the optical receiver is indispensable. There is a demand for a simple technology for improving reception sensitivity other than the error correction code.

Conventionally, as the technology for improving reception sensitivity of this type, there is an example disclosed in a patent document 1 described below.

In the patent document 1, improvement of reception sensitivity is attained by providing k sets (n×k) discriminators that have different thresholds from one another with n discriminators having an identical threshold as one set, an optical distributor that distributes a reception signal to the respective discriminators, and a selector that selects one of discrimination results of the respective discriminators and outputs the discrimination result, performing majority judgment using the selector, and selecting a discrimination result with higher accuracy from the discrimination results of the respective discriminators.

In a nonpatent literature 1 described below, for example, as an application of the reception technology described in the patent document 1, improvement of sensitivity of a receiver is realized by subjecting one optical signal to wavelength division at a reception stage, providing discriminators for the respective optical signals divided, and adopting more probable data from discrimination results in the respective discriminators.

Patent Document 1

Japanese Patent Application Laid-Open No. 2003-234699

Nonpatent Literature 1

Masahito Tomizawa, Yoshiaki Kisaka, Akira Hirano, and Yutaka Miyamoto, "Error correction without additional redundancy by novel optical receiver with diverse detection," in OSA Trends in Optics and Photonics (TOPS) vol. 70, Optical Fiber Communication Conference, Technical Digest, Post-conference Edition (Optical Society of America, Washington D.C., 2002), WX7, pp. 368-370.

In the realization of the very-high-speed/very-long-distance optical transmission systems, improvement of sensitivity of the optical receiver is an important element and a technology that is simple and has an easy configuration is indispensable.

However, the invention described in the nonpatent document 1 uses a method of dividing a spectrum of an optical signal using an optical filter. Thus, the invention has a problem in that a division penalty in the optical filter tends to occur and sufficient improvement of sensitivity cannot be expected.

Since the invention also uses the optical filter in implementation, there is also a problem in that limitation on a configuration occurs in terms of dependency on a signal modulation system, stability with respect to temperature, and the like.

Moreover, even if improvement of sensitivity of the optical receiver is realized by a minimum number of discriminators, it is necessary to control a discrimination threshold by preparing two sets of two discriminators (four discriminators in total). Thus, the method is not a simple and easy method from the viewpoint of control of the discriminators or implementation.

In view of such circumstances, it is an object of the present invention to provide an optical receiver that prevents occurrence of a division penalty due to an optical divider, eliminates dependency on a modulation system, and secures easiness of implementation.

DISCLOSURE OF INVENTION

An optical receiver according to one aspect of the present invention includes an optical divider that divides an optical input signal into a plurality of paths; an optical-to-electrical converter that converts the divided optical input signal into an electrical signal; a discriminator that outputs a discrimination result obtained by discriminating the electrical signal output from the optical-to-electrical converter based on a predetermined threshold; and an operational circuit that performs a predetermined operation based on the discrimination result output from the discriminator.

According to the present invention, the optical divider divides an optical input signal into a plurality of paths, the OE converters convert the optical input signals after division into electrical signals, the discriminators output discrimination results obtained by discriminating, based on predetermined thresholds, the electrical signals output from the OE converters, and the operational circuit performs a predetermined operation based on the discrimination results output from the discriminators.

BEST MODE(S) FOR CARRYING OUT THE INVENTION

Exemplary embodiments of an optical receiver according to the present invention are explained in detail below with reference to the accompanying drawings. The present invention is not limited by the embodiments.

First Embodiment

Figure 1:
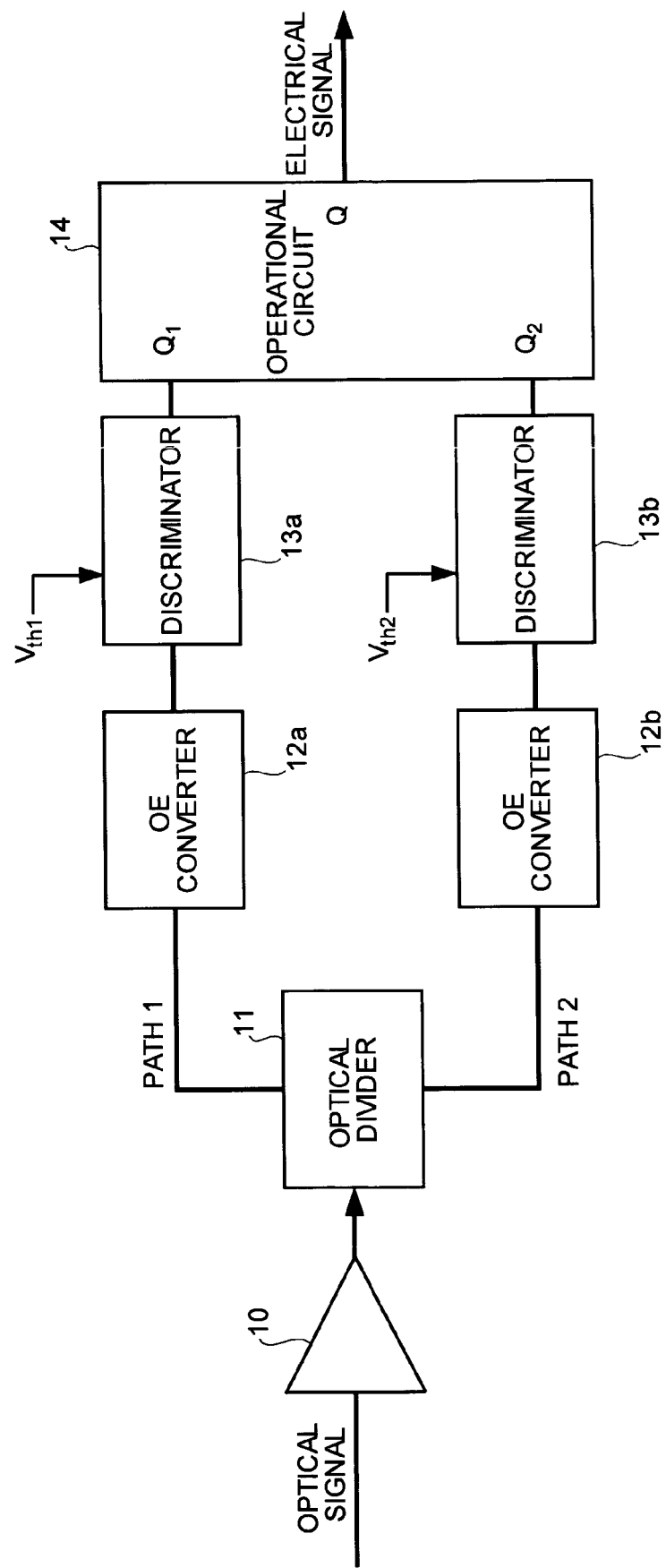
FIG. 1 is a block diagram of a structure of an optical receiver according to a first embodiment of the present invention.

FIG. 1 is a block diagram of a structure of an optical receiver according to a first embodiment of the present invention. The optical receiver shown in the figure includes an optical amplifier 10 that amplifies an optical input signal, an optical divider 11 that divides the optical input signal into two path, that is, a path 1 and a path 2, optical-to electrical (OE) converters 12a and 12b that convert the optical input signals after division into electrical signals, discriminators 13a and 13b that output discrimination results (digital data signals) obtained by discriminating, based on predetermined thresholds $V_{th1}$ and $V_{th2}$, the analog electrical signals output from the OE converters 12a and 12b, and an operational circuit 14 that performs a logical operation based on digital signals on the respective paths. The operational circuit 14 can be constituted by, for example, an OR circuit or an AND circuit.

Operations of the optical receiver shown in FIG. 1 are explained. In the figure, an optical signal transmitted from a not-shown optical transmitter or the like is input to this optical receiver. The optical input signal received is amplified by the optical amplifier 10 and, then, divided into the two paths, that is, the path 1 and the path 2, by the optical divider 11. The optical input signals divided into two paths are converted into electrical signals by the OE converters 12a and 12b and output to the discriminators 13a and 13b. The discriminators 13a and 13b output discrimination results (digital data signals) obtained by discriminating the analog electrical signals based on the predetermined thresholds $V_{th1}$ and $V_{th2}$ to the operational circuit 14. The operational circuit 14 outputs a processing result obtained by performing predetermined processing.

An output (a discrimination result) of the optical receiver at the time when the optical signals divided into the two paths have intersymbol interferences of the same degree and Gaussian noises at output levels of the same degree, respectively, is examined below.

In this examination, it is assumed that characteristics, fluctuation in discrimination sensitivity, and the like of the discriminators 13a and 13b can be neglected. It is assumed that, as to probability that a discrimination result concerning an arbitrary analog electrical signal is wrong, the Gaussian noises included in the optical signals on the respective paths are uncorrelated to each other such that mutual independency between the discriminators 13a and 13b is maintained.

First, an output of the operational circuit 14 constituted by an OR circuit is examined.

Under these conditions, an error occurs in an output result of the operational circuit 14 in the following cases.

Figures 2A, 2B, 2C:
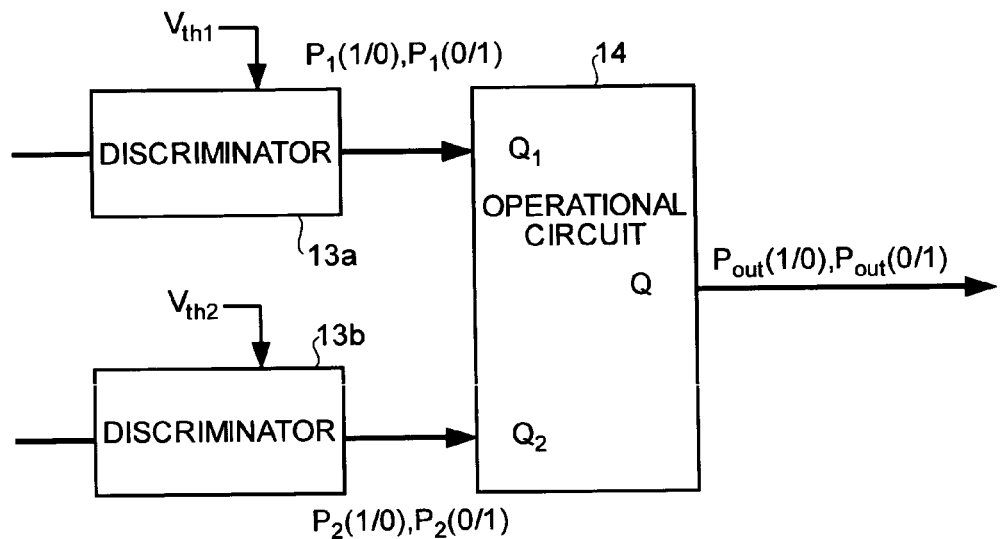
FIG. 2A is a diagram for explaining a flow of a discrimination result of the optical receiver shown in FIG. 1.
FIG. 2B is a diagram of a truth table of an OR circuit.
FIG. 2C is a diagram of a truth table of an AND circuit.

(a) In the case where logical "0" is input to an optical signal
When one of discrimination results of the discriminators 13a and 13b is wrong
When both discrimination results of the discriminators 13a and 13b are wrong
(b) In the case where logical "1" is input to an optical signal
When both discrimination results of the discriminators 13a and 13b are wrong An error rate $BER_{OR}$ of an output result at the time when the operational circuit 14 is an OR circuit is considered using FIGS. 2A and 2B. FIG. 2A is a diagram for explaining a flow of a discrimination result of the optical receiver shown in FIG. 1. FIG. 2B is a diagram of a truth table of the OR circuit.

In FIG. 2A, $P_1(1/0)$ shown at an output terminal of the discriminator 13a is probability that a discrimination result is misjudged as logical "1" when logical "0" is input to the discriminator 13a. $P_1(0/1)$ is probability that a discrimination result is misjudged as logical "0" when logical "1" is input to the discriminator 13a.

Similarly, $P_2(1/0)$ shown at an output terminal of the discriminator 13b is probability that a discrimination result is misjudged as logical "1" when logical "0" is input to the discriminator 13b. $P_2(0/1)$ is probability that a discrimination result is misjudged as logical "0" when logical "1" is input to the discriminator 13b.

In FIG. 2A, $P_{out}(1/0)$ shown at an output terminal of the operational circuit 14 is probability that a discrimination result among discrimination results processed by the operational circuit 14 based on the discrimination results of the discriminators 13a and 13b is misjudged as logical "1" when logical "0" is input to an input terminal of the optical receiver. Similarly, $P_{out}(0/1)$ is probability that the operational circuit 14 misjudges a discrimination result as logical "1" when logical "0" is input to the input terminal of the optical receiver.

Therefore, an error rate $BER_{OR}$ at the time when the operational circuit 14 is an OR circuit can be represented by $$BER_{OR} = \frac{1}{2}P_{OUT}(1/0) + \frac{1}{2}P_{OUT}(0/1) \quad (1)$$

$$= \frac{1}{2}\begin{bmatrix} P_1(1/0)P_2(1/0) + \\ P_1(1/0)[1 - P_2(1/0)] + \\ [1 - P_1(1/0)]P_2(1/0) \end{bmatrix} + \frac{1}{2}P_1(0/1)P_2(0/1)$$

In Equation (1), it is assumed that a mark rate, which is an occupied time ratio of the input signals "0" and "1" in a predetermined transmission time, is 50% (½).

Moreover, for easiness of examination, it is assumed 13b are equal. In this case, it is possible to set $V_{th1}$, $V_{th2}$, and $V_{th}$ as $V_{th1}=V_{th2}=V_{th}$. The following relations are established among $P_1(0/1)$, $P_1(1/0)$, $P_2(0/1)$, and $P_2(1/0)$ $P_1(1/0)=P_2(1/0)=P(1/0)$ $P_1(0/1)=P_2(0/1)=P(0/1)$ Thus, it is possible to simplify Equation (1) as $$BER_{OR} = \frac{1}{2}[2P(1/0) - P(1/0)^2 + P(0/1)^2] \quad (2)$$

As it is seen from Equation (2), when the OR circuit is used, if discrimination thresholds are adjusted to reduce P(1/0), P(0/1) is a main factor of an error. However, as indicated by Equation (2), since P(0/1) has effect on $BER_{OR}$ only in the order of a square, $BER_{OR} \sim P(0/1)^2 \sim BER_{RAW}^2$. $BER_{RAW}$ is an error rate at the time when usual optical reception is performed using a single discriminator.

An output of the operational circuit 14 constituted by an AND circuit is examined. FIG. 2C is a diagram of a truth table of the AND circuit.

Under conditions identical with those for the operational circuit 14 constituted by the OR circuit, an error occurs in an output result of the operational circuit 14 constituted by the AND circuit in the following cases.

(a) In the case where logical "0" is input to an optical signal
When both discrimination results of the discriminators 13a and 13b are wrong
(b) In the case where logical "1" is input to an optical signal
When one of discrimination results of the discriminators 13a and 13b is wrong When both discrimination results of the discriminators 13*a* and 13*b* are wrong In these cases, if an approach same as that for deriving Equation (1) when the operational circuit 14 is the OR circuit is performed, an error rate $BER_{AND}$ corresponding to Equation (2) at the time when the operational circuit 14 is the AND circuit can be represented by $$BER_{AND} = \frac{1}{2}[2P(0/1) - P(0/1)^2 + P(1/0)^2] \quad (3)$$

A condition of a mark rate and conditions of a threshold level and the like are identical with those in the case of the OR circuit.

Figure 3:
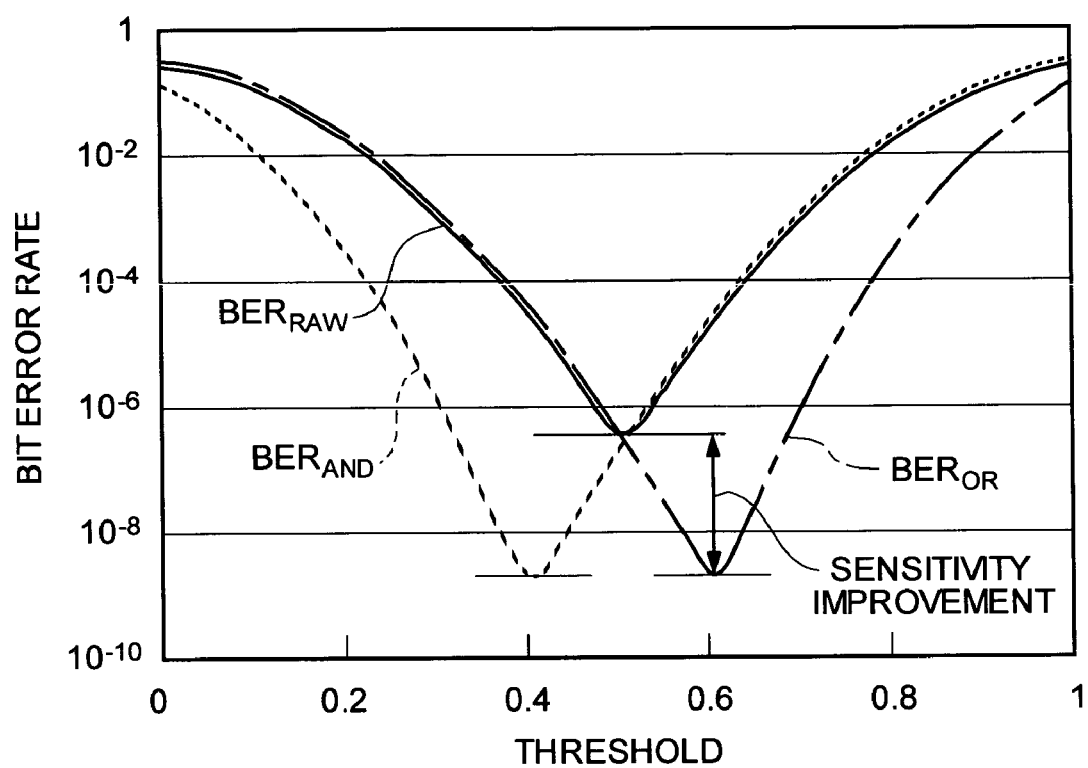
FIG. 3 is a graph of a bit error rate characteristic with respect to a change in a threshold.

FIG. 3 is a graph of a bit error rate characteristic with respect to a change in a threshold. More specifically, FIG. 3 is a graph of a result obtained by calculating a bit error rate of a discrimination output when a signal amplitude of electrical signals input to the discriminators 13*a* and 13*b* is set to "1" and standard deviations (equivalent to noise components) $\sigma_0$ and $\sigma_1$ of logical "0" and logical "1" are set as $\sigma_0 = \sigma_1 = 0.1$. In the figure, the threshold is on the abscissa and the bit error rate is on the ordinate.

In the figure, when usual optical reception is performed using a single discriminator, the bit error rate takes a minimum value when the threshold is a standard value (0.5). On the other hand, when the OR circuit is used as the operational circuit 14, the bit error rate takes a minimum value when the threshold is a value slightly higher than the standard value (in the figure, around 0.6). Moreover, the minimum value is reduced in the order of $10^{-2}$ compared with the time when the single discriminator is used. Thus, it is evident that sensitivity of discrimination is improved.

This sensitivity improvement effect is attained by setting the threshold of discrimination slightly higher than the standard value, or reducing P(1/0), which is the probability that logical "0" is misjudged as logical "1".

Similarly, when the AND circuit is used as the operational circuit 14, the bit error rate takes a minimum value when the threshold is slightly higher than the standard value (in the figure, around 0.4). The minimum value is reduced in the order of $10^{-2}$ compared with the time when the single discriminator is used. Sensitivity of discrimination is improved.

The sensitivity improvement effect in the case of the AND circuit is opposite to that in the case of the OR circuit. The sensitivity improvement effect is attained by setting the threshold of discrimination slightly lower than the standard value, or reducing P(0/1), which is the probability that logical "1" is misjudged as logical "0".

The characteristic shown in FIG. 3 indicates an example of a calculation result. For example, even when a noise distribution is different from the calculation result in FIG. 3 or even when a noise distribution is an asymmetric distribution ($\sigma_0 \neq \sigma_1$), by selecting predetermined values as $V_{th1}$ and $V_{th2}$, it is possible to improve reception sensitivity compared with that at the time when usual optical reception is performed using the single discriminator.

As explained above, according to the present embodiment, an optical input signal is divided into a plurality of paths, the optical input signals after division are converted into electrical signals, a predetermined operation is performed by the OR circuit, the AND circuit, or the like based on discrimination results obtained by discriminating, based on predetermined thresholds, the electrical signals output from the OE converters. Thus, it is possible to improve reception sensitivity of the optical receiver.

According to the present embodiment, an optical input signal is divided into two paths by the optical divider. However, the number of paths is not limited to two. The optical input signal may be divided into three or more arbitrary paths.

Second Embodiment

Figure 4:
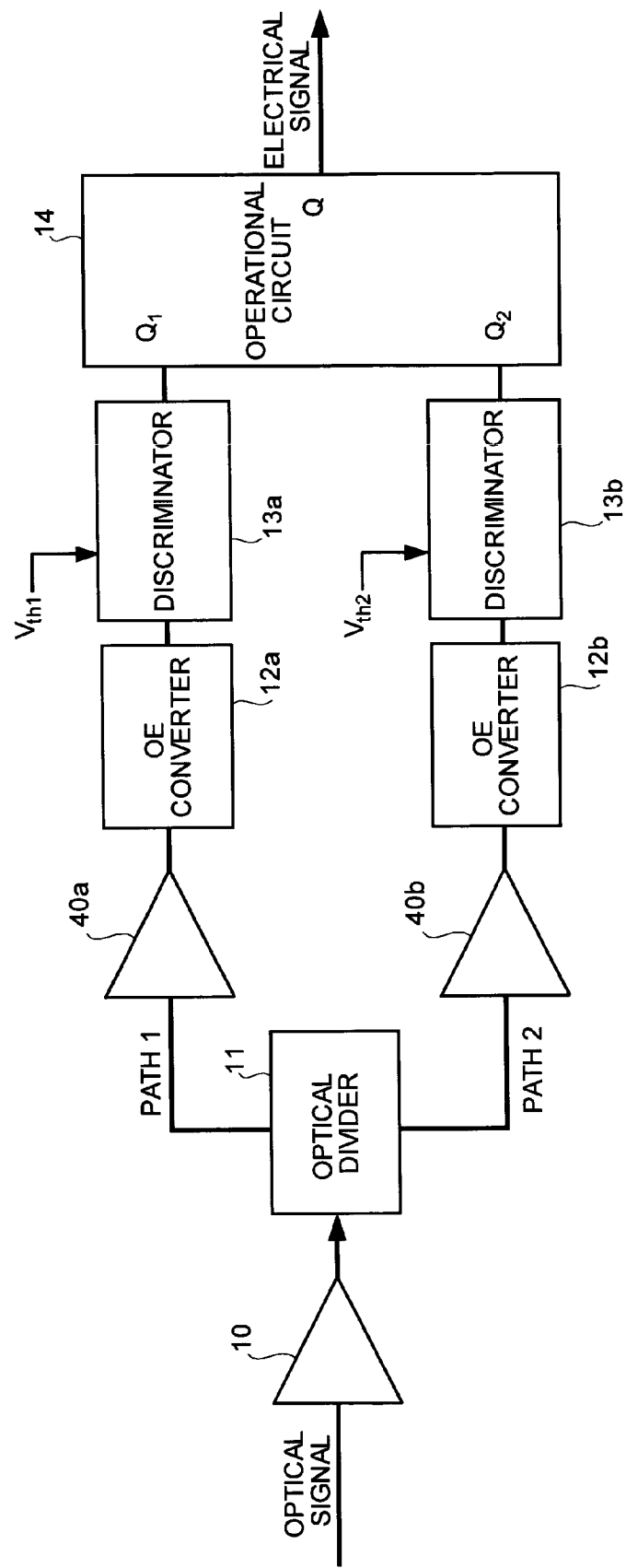
FIG. 4 is a block diagram of a structure of an optical receiver according to a second embodiment of the present invention.

FIG. 4 is a block diagram of a structure of an optical receiver according to a second embodiment of the present invention. The optical receiver shown in the figure includes optical amplifiers 40*a* and 40*b* for compensating for a fall in an optical level between the optical divider 11 and the OE converters 12*a* and 12*b*, respectively, in addition to the components of the optical receiver shown in FIG. 1. The other components are identical with or equivalent to those in the first embodiment. Thus, the components are denoted by the identical reference numerals and signs.

Operations of the optical receiver shown in FIG. 4 are explained below. In the figure, an optical signal transmitted from a not-shown optical transmitter or the like is input to the optical receiver. The optical input signal received is amplified by the optical amplifier 10 and, then, divided into the two paths, that is, the path 1 and the path 2, by the optical divider 11. The optical signals divided into the two paths are amplified by the optical amplifiers 40*a* and 40*b*, respectively. In this case, since optical power is sufficiently amplified by the optical amplifier 10, if an optical loss due to the optical divider 11 is small, deterioration in an optical signal to noise ratio (SNR) due to the optical amplifiers 40*a* and 40*b* with the operations in the first embodiment, explanation of the operations are omitted.

Since noises imparted by the optical amplifiers 40*a* and 40*b* are uncorrelated with each other, the optical signals divided into the two paths form an uncorrelated noise distribution.

Therefore, even when the optical amplifiers 40*a* and 40*b* for compensating for a fall in a level of the optical signals divided into the two paths are present between the optical divider 11 and the OE converters 12*a* and 12*b*, it is possible to improve reception sensitivity of the optical receiver as in the case of the first embodiment using the OE converters 12*a* and 12*b*, the discriminators 13*a* and 13*b*, and the operational circuit 14.

As explained above, according to the present embodiment, even if the optical receiver includes optical amplifiers for compensating for a fall in a level of optical signals divided into two paths, it is possible to improve reception sensitivity of the optical receiver without deteriorating an optical SNR.

As the optical amplifiers 10, 40*a*, and 40*b*, any optical amplifiers such as a rare-earth-doped fiber amplifier and a semiconductor optical amplifier (SOA) may be used.

According to the present embodiment, an optical input signal is divided into two paths by the optical divider. However, as in the first embodiment, the number of paths is not limited to two and the optical input signal may be divided into three or more arbitrary paths.

Third Embodiment

Figure 5:
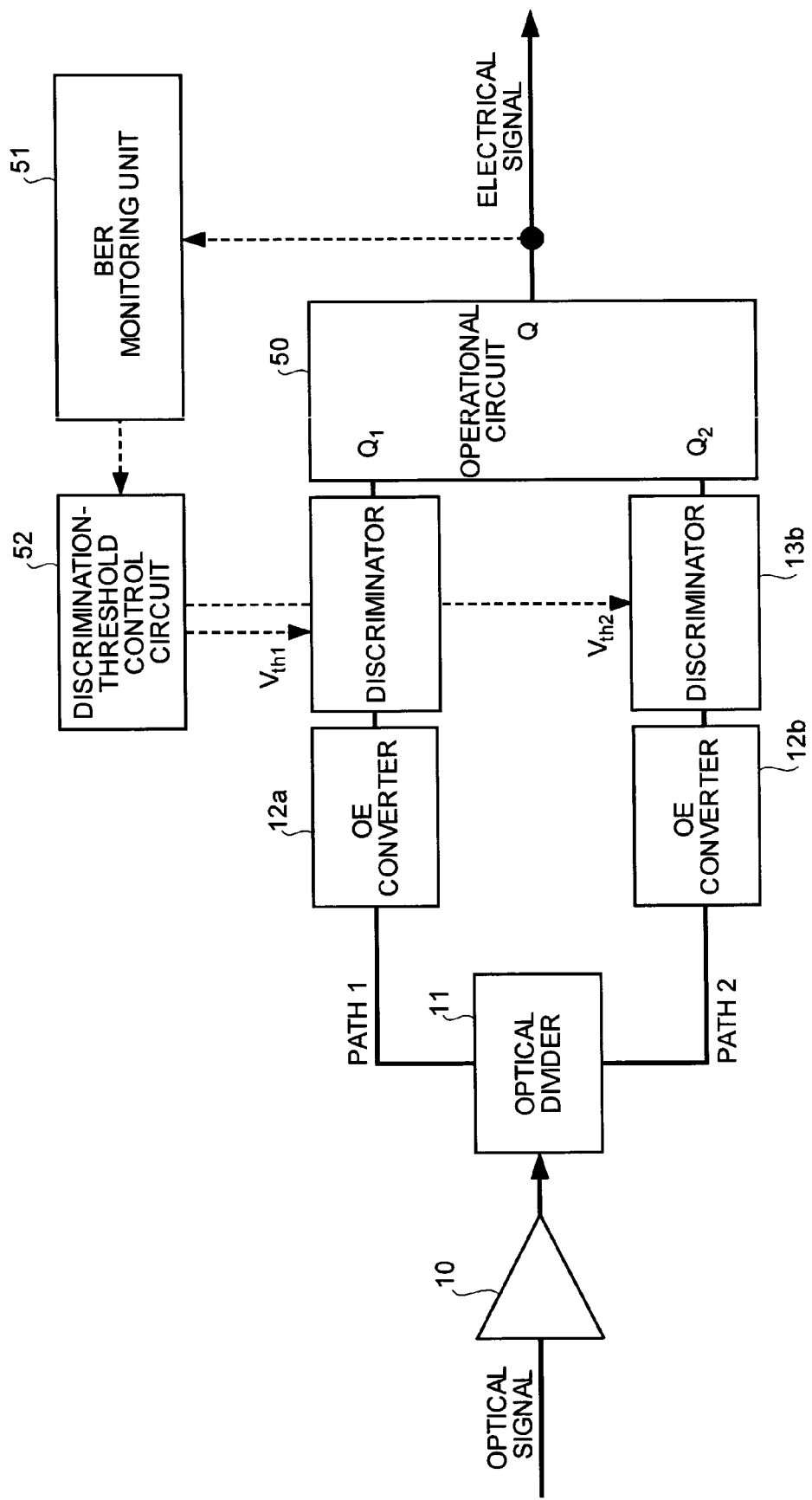
FIG. 5 is a block diagram of a structure of an optical receiver according to a third embodiment of the present invention.

FIG. 5 is a block diagram of a structure of an optical receiver according to a third embodiment of the present includes an operational circuit 50 having a function different from that of the operational circuit 14 in the structure of the optical receiver shown in FIG. 1. The optical receiver also includes a bit-error-rate (BER) monitoring unit 51 that monitors an output of the operational circuit 50 and a discrimination-threshold control circuit 52 that controls discrimination thresholds of the discriminators 13a and 13b based on an output of the BER monitoring unit 51. The other components are identical with or equivalent to those in the first embodiment. Thus, the components are denoted by the identical reference numerals and signs.

Operations of the optical receiver shown in FIG. 5 are explained below. It is assumed that conditions such as characteristics and fluctuation in discrimination sensitivity of the discriminators 13a and 13b, uncorrelation of Gaussian noises included in optical signals on respective paths, and mutual independency on discrimination results between the discriminators 13a and 13b are identical with those in the first embodiment.

In FIG. 5, an optical signal transmitted from a not-shown optical transmitter or the like is input to the optical receiver. The optical input signal received is amplified by the optical amplifier 10 and, then, divided into the two paths, that is, the path 1 and the path 2, by the optical divider 11. The optical input signals divided into the two paths are converted into electrical signals by the OE converters 12a and 12b and output to the discriminators 13a and 13b. The discriminators 13a and 13b output discrimination results (digital data signals) obtained by discriminating the analog electrical signals based on the predetermined thresholds $V_{th1}$ and $V_{th2}$ to the operational circuit 50. The operational circuit 50 outputs an operation result obtained by performing a predetermined operation based on the discrimination results of the discriminators 13a and 13b. On the other hand, the discrimination-threshold control circuit 52 monitors a bit error rate based on the output of the operational circuit 50 and outputs a monitoring result to the BER monitoring unit 51. The discrimination-threshold control circuit 52 controls discrimination thresholds of the discriminators 13a and 13b to reduce the bit error rate.

In the first and the second embodiments, thresholds imparted to the discriminators 13a and 13b are determined according to whether the operational circuit 14 is the OR circuit or the AND circuit as described above. On the other hand, according to the present embodiment, thresholds imparted to the discriminators 13a and 13b are determined based on a bit error rate. In other words, thresholds imparted to the discriminators 13a and 13b are determined first and the operational circuit 50 applies an optimum operational processing based on the thresholds determined.

As a simple example, when the operational circuit 50 has a function of an OR circuit and a function of an And circuit, if the thresholds imparted to the discriminators 13a and 13b are set smaller than a standard value, a function of the operational circuit 50 only has to be switched to the function of the AND circuit. On the other hand, if the thresholds imparted to the discriminators 13a and 13b are set larger than the standard value, a function of the operational circuit 50 only has to be switched to the function of the OR circuit.

Besides the method described above, for example, a method of sweeping discrimination thresholds by several points to determine a point at which an error rate is minimized may be adopted. Alternatively, discrimination thresholds may be swept in a try and error manner. Thresholds imparted to the discriminators 13a and 13b do not always have to be set equal.

These methods are particularly effective when a noise distribution of a signal is not Gaussian noise, when the noise distribution is asymmetric noise, or when a discrimination sensitivity difference between discriminators is large.

As explained above, according to the present embodiment, a function of the operational circuit is switched to, for example, the OR circuit or the AND circuit. Thus, even when an input condition of an optical signal changes, it is possible to maintain predetermined reception sensitivity.

According to the present embodiment, an optical input signal is divided into two paths by the optical divider. However, as in the other embodiments, the number of paths is not limited to two. The optical input signal may be divided into three or more arbitrary paths.

Fourth Embodiment

Figure 6:
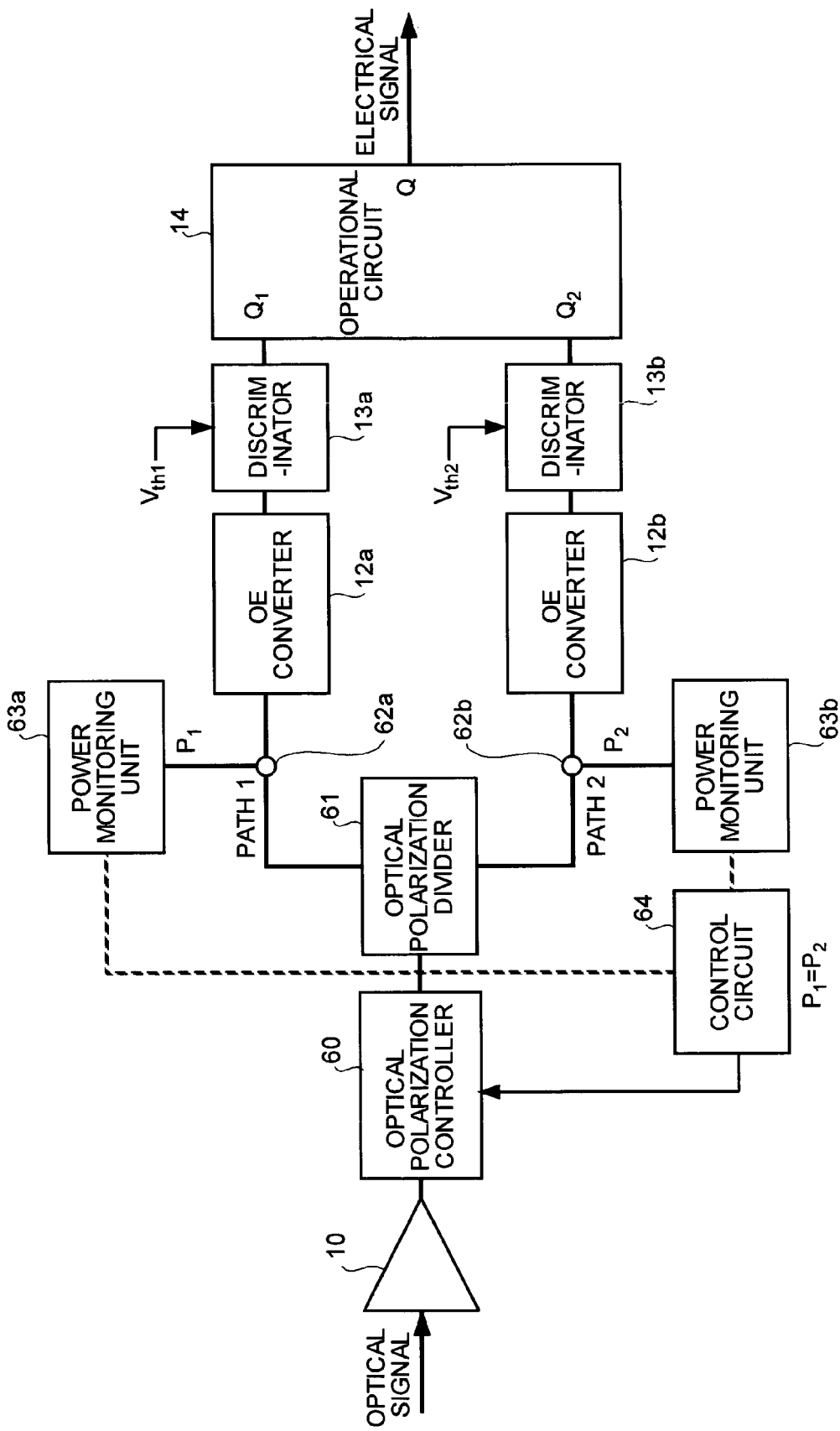
FIG. 6 is a block diagram of a structure of an optical receiver according to a fourth embodiment of the present invention.

FIG. 6 is a block diagram of a structure of an optical receiver according to a fourth embodiment of the present invention. The optical receiver shown in the figure includes an optical polarization divider 61 instead of the optical divider 11 in the structure of the optical receiver shown in FIG. 1. The optical receiver also includes, between the optical polarization divider 61 and the optical amplifier 10, an optical polarization controller 60 that controls a plane of polarization of an optical signal. Moreover, the optical receiver includes power monitoring units 63a and 63b that monitor optical power of an optical signal via optical couplers 62a and 62b provided in respective paths between the optical polarization divider 61 and the OE converters 12a and 12b. The other components are identical with or equivalent to those in the first embodiment. Thus, the components are denoted by the identical reference numerals and signs.

Operations of an optical receiver shown in FIG. 6 are explained below. In the figure, an optical signal transmitted from a not-shown optical transmitter is input to the optical receiver. The optical input signal received is amplified by the optical amplifier 10 and, then, subjected to polarization control by the optical polarization controller 60, and divided into the two paths, that is, the path 1 and the path 2, by the optical polarization divider 61.

The optical signals divided into the path 1 and the path 2 are tapped by the optical couplers 62a and 62b. Optical power $P_1$ of the path 1 and optical power $P_2$ of the path 2 are monitored by the power monitoring units 63a and 63b. A control circuit 64 controls the optical polarization controller 60 based on information from the power monitoring such that $P_1$ is always equal to $P_2$.

With the structure described above, it is possible to stably receive the optical signals on the two paths.

ASE (Amplified Spontaneous Emission) noise components included in the two paths subjected to polarization division are in a polarization state in which the ASE noise components are orthogonal to each other. The ASE noise components are amplified independently from each other when the ASE noise components are optically amplified. Thus, it is experimentally indicated that the ASE noise components forms an uncorrelated noise distribution.

Therefore, even when the optical polarization controller 60, the optical polarization divider 61, and the optical couplers 62a and 62b are present on paths of an optical signal, as in the first embodiment, there is an effect that reception sensitivity is improved by the OE converters 12a and 12b, the discriminators 13a and 13b, and the operational circuit 14.

As explained above, according to the present embodiment, the optical polarization controller is controlled such that respective output values of optical signal powers on a plurality of paths monitored by optical monitors are substantially equal. This makes it possible to stably receive optical signals on the paths.

According to the present embodiment, an optical input signal is divided into two paths by the optical divider. However, as in the other embodiments, the number of paths is not limited to two. The optical input signal may be divided into three or more arbitrary paths.

Fifth Embodiment

Figure 7:
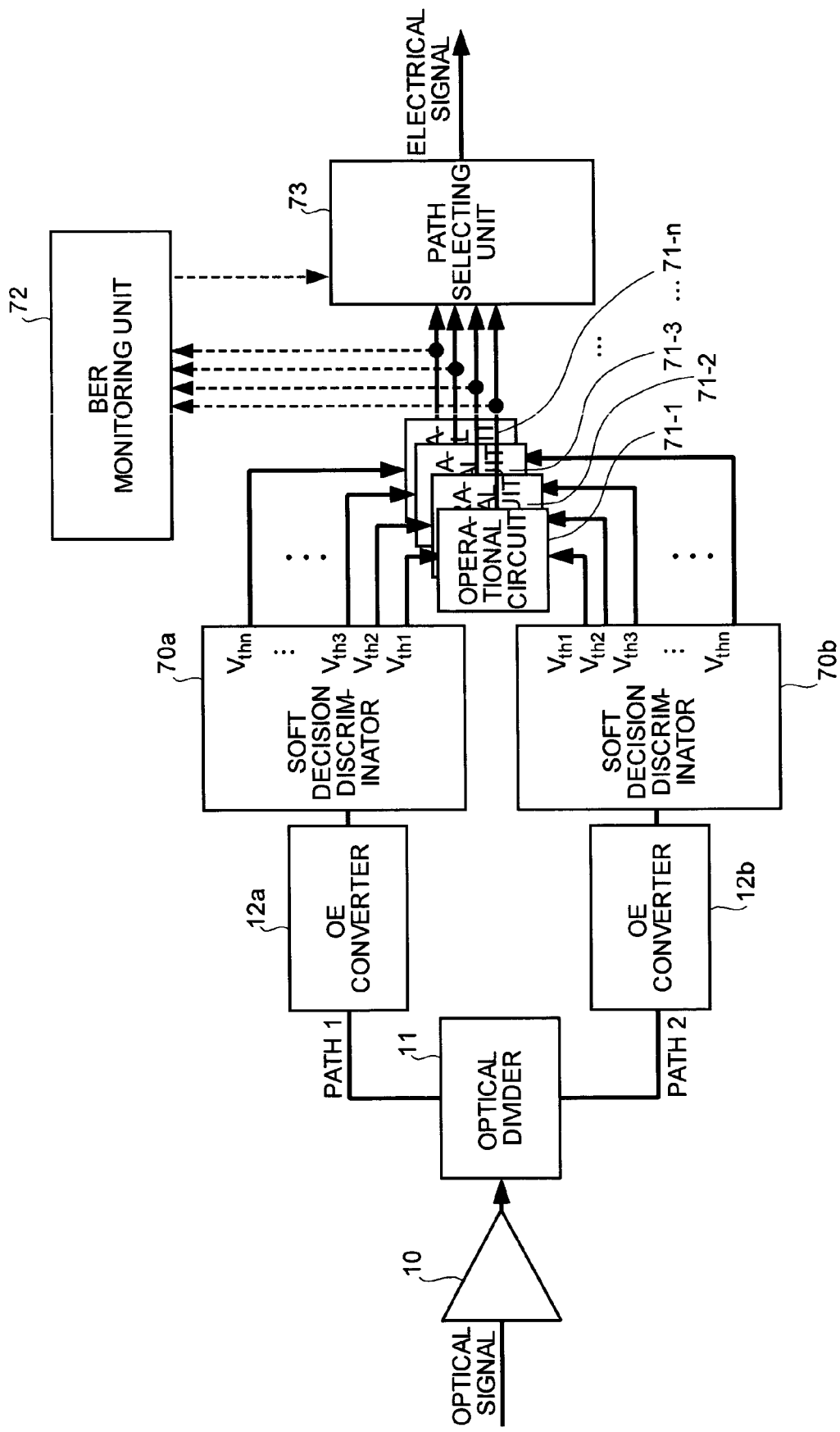
FIG. 7 is a block diagram of a structure of an optical receiver according to a fifth embodiment of the present invention.

FIG. 7 is a block diagram of a structure of an optical receiver according to a fifth embodiment of the present invention. The optical receiver shown in the figure includes soft decision discriminators 70a and 70b instead of the discriminators 13a and 13b in the structure of the optical receiver shown in FIG. 5. The optical receiver also includes a plurality of operational circuits 71-1, 71-2, . . . , 71-n in association with a plurality of threshold levels and a BER monitoring unit 72 that can monitor bit error rates of a plurality of operational circuit outputs. Moreover, the optical receiver includes a path selecting unit 73 that selects an optimum discrimination result out of output results of the operational circuits 71-1, 71-2, . . . , 71-n. The other components are identical with or equivalent to those in the third embodiment. The components are denoted by the identical reference numerals and signs.

Operations of the optical receiver shown in FIG. 7 are explained below. It is assumed that conditions such as characteristics and fluctuation in discrimination sensitivity of the discriminators 13a and 13b, uncorrelation of Gaussian noises included in optical signals of respective paths, and mutual independency on discrimination results between the discriminators 13a and 13b are identical with those in the third embodiment.

In FIG. 7, an optical signal transmitted from a not-shown optical transmitter or the like is input to the optical receiver. The optical input signal received is amplified by the optical amplifier 10 and, then, divided into the two paths, that is, the path 1 and the path 2, by the optical divider 11. The optical input signals divided into the two paths are converted into electrical signals by the OE converters 12a and 12b and output to the soft decision discriminators 70a and 70b. The soft decision discriminators 70a and 70b output discrimination results (digital data signals) obtained by discriminating the analog electrical signals based on predetermined thresholds $V_{th1}, V_{th2}, \ldots, V_{thn}$ to the operational circuits 71-1, 71-2, . . . , 71-n. Each of the operational circuits 71-1, 71-2, . . . , 71-n outputs an operation result obtained by performing a predetermined operation based on the discrimination results of the soft decision discriminators 70a and 70b.

On the other hand, the BER monitoring unit 72 monitors a bit error rate based on the respective outputs of the operational circuits 71-1, 71-2, . . . , 71-n and outputs monitoring results to the path selecting unit 73. The path selecting unit 73 selects and outputs an operational circuit output having a smaller bit error rate.

According to the present embodiment, unlike the fourth embodiment, the soft decision discriminators are used as the discriminators and an optimum discrimination result is selected out of outputs of the operational circuits. This makes it possible to further reduce a bit error rate while improving reception sensitivity.

As explained above, according to the present embodiment, the soft decision discriminating means are used to discriminate electrical signals and an output result having a low error rate is selected based on monitoring information of a bit error rate. This makes it possible to further reduce the bit error rate while improving reception sensitivity.

According to the present embodiment, an optical input signal is divided into two paths by the optical divider. However, as in the other embodiments, the number of paths is not limited to two. The optical input signal may be divided into three or more arbitrary paths.

INDUSTRIAL APPLICABILITY

As described above, the optical receiver according to the present invention is useful as an optical receiver applicable to very-high-speed/very-long-distance optical transmission systems and particularly suitable, for example, when it is desired to improve reception sensitivity of these systems.

The invention claimed is:

1. An optical reception method comprising:
   dividing, by an optical divider, an optical input signal into a plurality of paths;
   converting the divided optical input signals into respective electrical signals;
   outputting discrimination results by discriminating the respective converted electrical signals by utilizing a plurality of discriminators based on predetermined thresholds, wherein said predetermined thresholds imparted to the plurality of discriminators are determined according to a predetermined logical operation;
   monitoring a bit error rate of an output result performed by said predetermined logical operation;
   changing levels of the predetermined thresholds based on monitoring information of the bit-error-rate; and
   switching a function of the logical operation based on the levels of the predetermined threshold such that
      when the level of the predetermined thresholds is set to a value smaller than an optimum threshold that is used when discriminating the optical input signals divided into the paths with a single discriminator, a logical AND function is selected, and
      when the level of the predetermined thresholds is set to a value larger than the optimum threshold, a logical OR function is selected.

2. The optical reception method according to claim 1, wherein
   dividing the optical input signal based on a polarization state of the optical input signal.

3. The optical reception method according to claim 2, further comprising:
   monitoring the respective optical signal powers on the paths; and
   controlling the optical polarization based on the optical signal powers such that output values of the monitored optical signal powers become substantially equal.

4. The optical reception method according to claim 1, wherein
   the predetermined thresholds of the discriminators are substantially equal.

5. An optical communication method comprising:
   transmitting an optical signal; and
   receiving the optical signal transmitted, wherein
   the receiving includes:
      dividing, by an optical divider, an optical input signal into a plurality of paths;
      converting the divided optical input signals into respective electrical signals;
      outputting discrimination results by discriminating the respective converted electrical signals by utilizing a plurality of discriminators based on predetermined thresholds, wherein said predetermined thresholds imparted to the plurality of discriminators are determined according to a predetermined logical operation;

monitoring a bit error rate of an output result performed b said predetermined logical operation;

changing levels of the predetermined thresholds based on monitoring information of the bit-error-rate; and switching a function of the logical operation based on the levels of the predetermined threshold such that when the level of the predetermined thresholds is set to a value smaller than an optimum threshold that is used when discriminating the optical input signals divided into the paths with a single discriminator, a logical AND function is selected, and when the level of the predetermined thresholds is set to a value larger than the optimum threshold, a logical OR function is selected.

6. An optical receiver comprising:

an optical divider that divides an optical input signal into a plurality of paths;

a plurality of optical-to-electrical converters that respectively converts the divided optical input signals into electrical signals;

a plurality of discriminators that respectively outputs discrimination results by discriminating the electrical signals output from the optical-to-electrical converters based on predetermined thresholds;

an operational circuit that performs a predetermined logical operation with the discrimination results output from the discriminators;

a bit-error-rate monitoring unit that monitors a bit error rate of an output result of the operational circuit; and a discrimination-threshold control circuit that changes levels of the predetermined thresholds of the discriminators based on monitoring information of the bit-error-rate monitoring unit, wherein when the level of the predetermined thresholds is set to a value smaller than an optimum threshold that is used when discriminating the optical input signals divided into the paths with a single discriminator, a logical AND function is selected, and when the level of the predetermined thresholds is set to a value larger than the optimum threshold, a logical OR function is selected.

7. The optical receiver according to claim 6, wherein the optical divider is an optical polarization divider that divides the optical input signal based on a polarization state of the optical input signal.

8. The optical receiver according to claim 7, further comprising:

an optical polarization controller provided at a pre-stage of the optical polarization divider;

a plurality of power monitoring units that respectively monitors optical signal powers on the paths; and a control circuit that controls the optical polarization controller based on the optical signal powers, wherein the control circuit controls the optical polarization controller such that output values of the optical signal powers monitored by the optical monitors become substantially equal.

9. The optical receiver according to claim 6, wherein the predetermined thresholds of the discriminators are substantially equal.

10. An optical communication system comprising:

an optical transmitter that transmits an optical signal; and an optical receiver that receives the optical signal transmitted from the optical transmitter, wherein the optical receiver includes an optical divider that divides an optical input signal into a plurality of paths;

a plurality of optical-to-electrical converters that respectively converts the divided optical input signals into electrical signals;

a plurality of discriminators that respectively outputs discrimination results by discriminating the electrical signals output from the optical-to-electrical converters based on predetermined thresholds;

an operational circuit that performs a predetermined logical operation with the discrimination results output from the discriminators;

a bit-error-rate monitoring unit that monitors a bit error rate of an output result of the operational circuit; and a discrimination-threshold control circuit that changes levels of the predetermined thresholds of the discriminators based on monitoring information of the bit-error-rate monitoring unit, wherein the operational circuit performs a logical AND function when the level of the predetermined thresholds is set to a value smaller than an optimum threshold that is used when discriminating the optical input signals divided into the paths with a single discriminator, and said operational circuit performs a logical OR function when the level of the predetermined thresholds is set to a value larger than the optimum threshold.

11. The optical communication system according to claim 10, wherein the optical divider is an optical polarization divider that divides the optical input signal based on a polarization state of the optical input signal.

12. The optical communication system according to claim 11, further comprising:

an optical polarization controller provided at a pre-stage of the optical polarization divider;

a plurality of power monitoring units that respectively monitors optical signal powers on the paths; and a control circuit that controls the optical polarization controller based on the optical signal powers, wherein the control circuit controls the optical polarization controller such that output values of the optical signal powers monitored by the optical monitors become substantially equal.

13. The optical communication system according to claim 11, wherein the predetermined thresholds of the discriminators are substantially equal.

* * * * *